Aug. 12, 1924.  
F. M. YOUNG  
RADIATOR SUSPENSION STRUCTURE  
Filed April 16, 1923  
1,504,803

Witness  
Martin H. Olsen

Inventor  
Fred M. Young  
By Rummler & Rummler  
Attys.

Patented Aug. 12, 1924.

1,504,803

UNITED STATES PATENT OFFICE.

FRED M. YOUNG, OF RACINE, WISCONSIN.

RADIATOR SUSPENSION STRUCTURE.

Application filed April 16, 1923. Serial No. 632,372.

*To all whom it may concern:*

Be it known that I, FRED M. YOUNG, a citizen of the United States of America, and a resident of Racine, county of Racine and State of Wisconsin, have invented a new and useful Improvement in Radiator Suspension Structures, of which the following is a specification.

This invention relates to the supporting means of radiators, condensers, coolers, or like appliances, on the frames or bodies of automobiles, airplanes, and other vehicles.

The objects of the invention are to improve the means of supporting radiators, in order to overcome injury thereto due to spreading or a racking motion of the frame to which the radiators are attached; to make possible rapid assembly of a radiator in a vehicle, and to provide for easy disassembly or separation of the radiator from its shell; to provide a suspension means for radiators which is in the central plane of weight from side to side of the radiator; to provide a construction in which the radiator is independent of the surrounding shell, that is, having no direct attachment to the shell except through the brackets which support the radiator on the vehicle frame; to provide improved means for supporting the radiator shell; to provide a suspension means for the radiator which effectively protects the radiator from injury due to jarring movements of the vehicle frame; to provide a radiator support having connection only with the upper and lower tanks of the radiator to relieve the core of the radiator from unnecessary strains; and to provide a desirable means in connection with a radiator suspension structure for supporting the headlights of the vehicle.

The objects of the invention are accomplished by the construction shown in the drawings, in which:—

Figure 1:
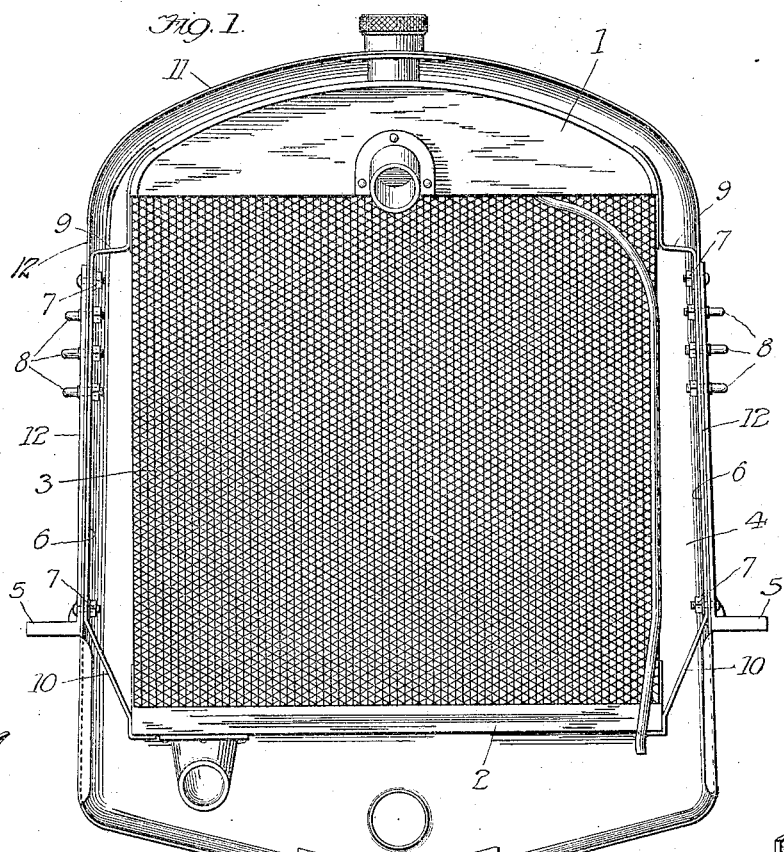
Figure 1 is a rear view of a radiator, its suspension means and its surrounding shell.
Figure 3:
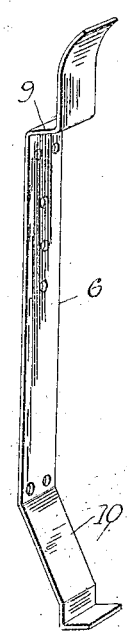
Figures 3 and 4 are perspective details of the radiator supporting brackets.
Figure 2:
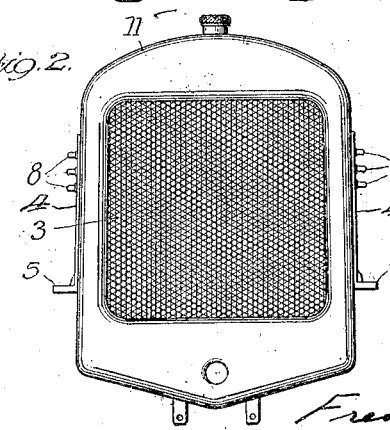
Figure 2 is a front view of the construction shown in Figure 1.
Figure 4:

The construction as illustrated comprises a radiator or condenser, which may be of any of the customary designs, usually including upper and lower tanks connected together by conduits for the circulation of the cooling medium. At each side of the radiator is a bracket attached at its ends respectively to the sides of the upper and lower tanks and so formed to constitute a resilient support for a radiator. These brackets are in turn bolted to other rigid brackets which are secured to the vehicle frame. The surrounding shell of the radiator is clamped between the two pairs of brackets, and is thus only indirectly connected to the radiator proper and may be quickly detached, or if desired, entirely dispensed with without interfering with the proper support and functioning of the radiator.

The supporting brackets provides for a resilient suspension of the radiator in line with its center of gravity, to avoid any possible racking motion of the radiator or a rocking thereof, with respect to the vehicle frame.

Referring to the drawings, the radiator illustrated is of a well-known general type, including upper and lower tanks 1 and 2 connected by the channeled core 3, providing for communication between the upper and lower tanks and for the circulation of air from the front to the rear of the radiator. The improved suspension means includes the vertical brackets 4, provided with the horizontally extending apertured ears, by which these brackets are bolted to the machine frame. The suspension means also include a second pair of brackets 6 secured to the brackets 4 by the bolts 7 and the lamp supporting bolts or trunnions 8. Brackets 6 are bent at 9 and 10 to provide for a resilient connection between the radiator and the vertically extending rigid frame or brackets 4. The upper and lower ends of the brackets 6 are riveted and soldered or bolted to the tanks 1 and 2. The radiator shell 11 is supported by its rearwardly extending flanges 12 passing between the brackets 4 and 6 to which the flanges are secured by the bolts 7 and trunnions 8. It may, therefore, be seen that the shell is not part of the supporting means for the radiator, as is the customary practice. The shell is substantially independent of the radiator and may be dispensed with, and also, as shown, does not interfere with inspection or repair of the radiator. The shell and radiator may be quickly separated without injury to either. The construction is further distinguishable from other arrangements of radiator suspension means in that the support is in a central vertical plane passing from side to side of the radiator and not at the side of this plane. The latter customary way of supporting a radiator results in a tendency of a racking motion in the radiator due to vibration. The resilient brackets 6 save the radiator from harm, which sometimes occurs from the spreading of the machine frame.

Although but one specific embodiment of this invention has been herein shown and described, it will be understood that numerous details of the construction shown may be altered or omitted without departing from the spirit of this invention as defined by the following claims.

I claim:

1. The combination of a radiator, a pair of suspension brackets extending vertically at opposite sides of the radiator core and spaced therefrom, the upper and lower ends of said suspension brackets being bowed toward the radiator and attached respectively to the upper and lower tanks of the radiator, and brackets for supporting the radiator on the vehicle frame, said supporting brackets having vertical arms extending along and secured to said suspension brackets intermediate the bowed ends thereof.

2. The combination of a radiator, a pair of suspension brackets extending vertically at opposite sides of the radiator core and spaced therefrom, the upper and lower ends of said suspension brackets being bowed toward the radiator and attached respectively to the upper and lower tanks of the radiator, brackets for supporting the radiator on the vehicle frame, said supporting brackets having vertical arms extending along and adjacent to the said suspension brackets intermediate the bowed ends thereof, and a radiator housing spaced from the radiator and having side portions clamped between adjacent pairs of said brackets.

Signed at Racine this sixth day of April, 1923.

FRED M. YOUNG.